United States Patent
Fu et al.

(10) Patent No.: US 8,033,469 B2
(45) Date of Patent: Oct. 11, 2011

(54) APPARATUS FOR PERFORMING MULTIMEDIA-BASED DATA TRANSMISSION AND ASSOCIATED METHOD

(75) Inventors: Chih-Ming Fu, Taichung (TW); Yu-Pao Tsai, Kaohsiung County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 21 days.

(21) Appl. No.: 12/635,712

(22) Filed: Dec. 11, 2009

(65) Prior Publication Data

US 2011/0139874 A1    Jun. 16, 2011

(51) Int. Cl.
*G06K 7/10* (2006.01)

(52) U.S. Cl. .............. 235/462.01; 235/462.11; 235/375; 235/454

(58) Field of Classification Search .............. 235/462.01, 235/462.11, 375, 454
See application file for complete search history.

(56) References Cited

U.S. PATENT DOCUMENTS

| | | | |
|---|---|---|---|
| 4,573,083 A | 2/1986 | Shimizu | |
| 6,603,737 B1 | 8/2003 | Fukunaga et al. | |
| 6,997,384 B2 | 2/2006 | Hara | |
| 7,111,787 B2 | 9/2006 | Ehrhart | |
| 7,290,712 B2 | 11/2007 | Leoniak | |
| 7,337,948 B2 | 3/2008 | Melick et al. | |
| 7,350,708 B2 | 4/2008 | Melick et al. | |
| 7,434,724 B2 | 10/2008 | Lane | |
| 7,455,232 B2 | 11/2008 | Epshteyn | |
| 7,466,308 B2 | 12/2008 | Dehlin | |
| 7,467,380 B2 | 12/2008 | Kurlander et al. | |
| 7,469,835 B2 | 12/2008 | Zhu et al. | |
| 7,490,774 B2 | 2/2009 | Zhu et al. | |
| 7,490,778 B2 | 2/2009 | Zhu et al. | |
| 2007/0005173 A1* | 1/2007 | Kanitz et al. | 700/109 |
| 2007/0007349 A1* | 1/2007 | Uchida et al. | 235/462.01 |
| 2007/0205283 A1* | 9/2007 | Vesikivi et al. | 235/451 |
| 2008/0245869 A1* | 10/2008 | Berkun et al. | 235/462.1 |
| 2008/0305795 A1* | 12/2008 | Murakami et al. | 455/435.1 |
| 2010/0325490 A1* | 12/2010 | Anvin et al. | 714/37 |

* cited by examiner

*Primary Examiner* — Allyson Trail
(74) *Attorney, Agent, or Firm* — Winston Hsu; Scott Margo

(57) ABSTRACT

An apparatus for performing multimedia-based data transmission includes an image capturing device and a processing circuit. The image capturing device is a peripheral device for a user to capture images. In addition, in a situation where the apparatus is utilized as a target apparatus, the image capturing device is arranged to capture at least one multi-dimensional barcode image carrying data. Additionally, the processing circuit is arranged to control operations of the apparatus, wherein in the situation where the apparatus is utilized as the target apparatus, the processing circuit is arranged to extract the data carried by the multi-dimensional barcode image for further use. In particular, the aforementioned at least one multi-dimensional barcode image may represent a plurality of multi-dimensional barcode images. An associated method is also provided.

22 Claims, 6 Drawing Sheets

APPARATUS FOR PERFORMING MULTIMEDIA-BASED DATA TRANSMISSION AND ASSOCIATED METHOD

BACKGROUND

The present invention relates to data transmission, and more particularly, to apparatus for performing multimedia-based data transmission and to associated method.

It is hardly workable to perform data transmission, such as file exchange, photo exchange, etc., between mobile phones of different brands or different models since they are typically designed according to different schemes. For example, not all mobile phones are equipped with additional hardware resources such as Bluetooth (BT) or Wireless Local Area Network (Wireless LAN, WLAN) communication modules for users to exchange data between their mobile phones. For those who own the mobile phones that are equipped with additional hardware resources such as BT or WLAN communication modules, they might still find it inconvenient to exchange data from one mobile phone to the other. For example, in a situation where the users are not so familiar with all the settings of the BT or WLAN communication modules of these mobile phones, it seems unlikely that performing data transmission between the mobile phones can be practiced with ease since these settings are too complicated to be arbitrarily used at once. The users might need to wait for a while for connection establishment and synchronization. In addition, the situation would become even worse when the mobile phones are designed with different platforms. Thus, a novel method is required for providing the users with handy apparatus capable of performing data transmission efficiently and rapidly with ease whenever it is needed to exchange data, such as files, business cards, photos, etc.

SUMMARY

It is therefore an objective of the claimed invention to provide apparatus for performing multimedia-based data transmission with simple operations, and to provide associated method, in order to solve the above-mentioned problems.

It is another objective of the claimed invention to provide apparatus for performing multimedia-based data transmission between two mobile devices, and to provide associated method of performing data transmission efficiently and rapidly with ease whenever users need to exchange data, such as files, photos, memorandums (memos), electronic business cards, etc.

An exemplary embodiment of an apparatus for performing multimedia-based data transmission comprises an image capturing device and a processing circuit. The image capturing device is a peripheral device for capturing images, wherein the image capturing device is arranged to capture a plurality of multi-dimensional barcode images carrying data. In addition, the processing circuit is arranged to control operations of the apparatus and to extract the data carried by the multi-dimensional barcode images.

An exemplary embodiment of a method for performing multimedia-based data transmission comprises: providing an apparatus with an image capturing device, wherein the image capturing device is a peripheral device for capturing images; utilizing the image capturing device to capture a plurality of multi-dimensional barcode images carrying data; and extracting the data carried by the multi-dimensional barcode images.

An exemplary embodiment of an apparatus for performing multimedia-based data transmission comprises an image display device and a processing circuit. The processing circuit is arranged to control operations of the apparatus, wherein the processing circuit is arranged to convert data to multi-dimensional barcode images. In addition, the image display device is a peripheral device for displaying visual information, wherein the image display device is arranged to display one or more multi-dimensional barcode images carrying data.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
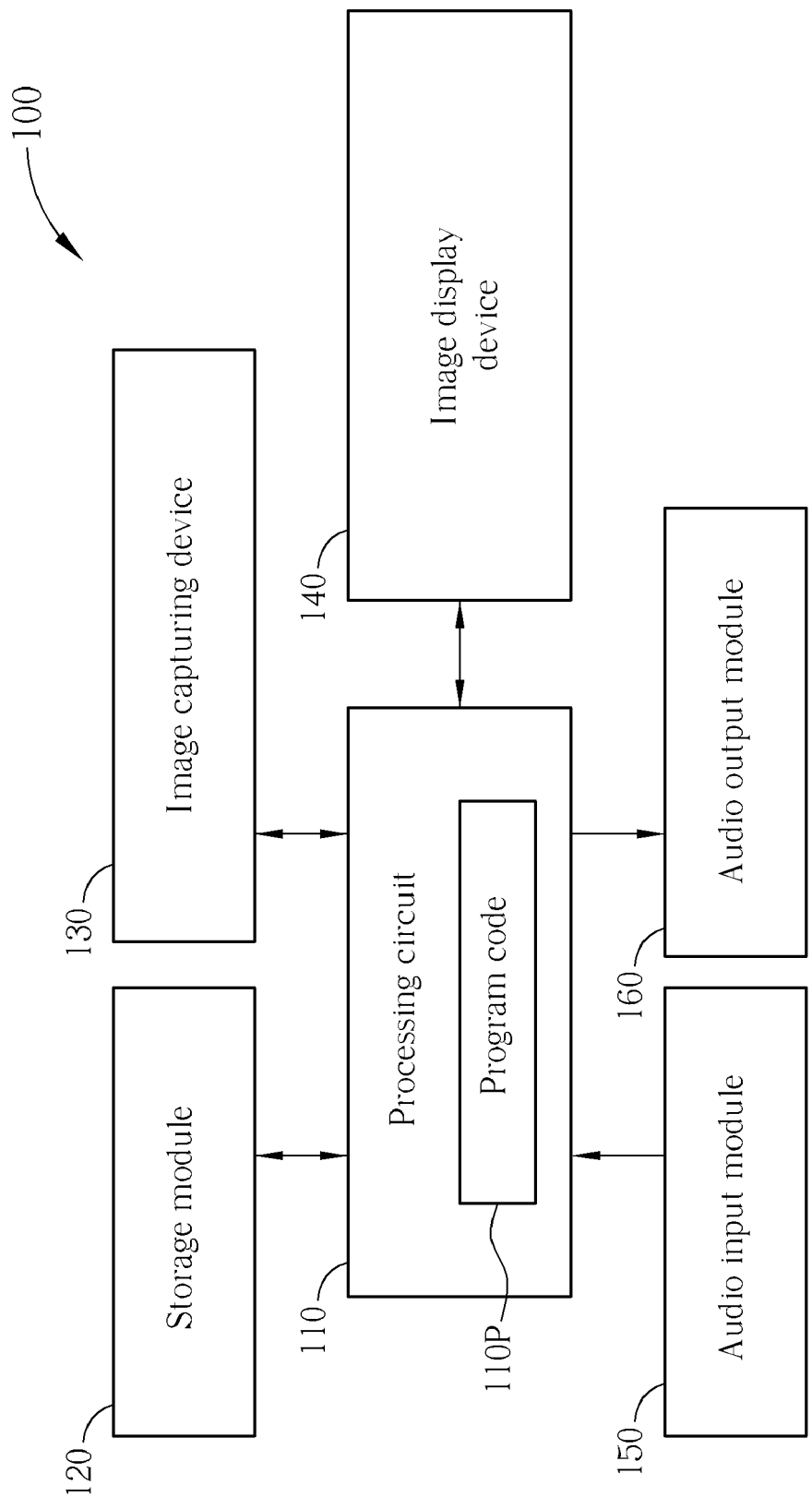
FIG. 1 is a diagram of an apparatus for performing multimedia-based data transmission according to an embodiment of the present invention.

Please refer to FIG. 1, which illustrates a diagram of an apparatus 100 for performing multimedia-based data transmission according to an embodiment of the present invention, where the apparatus 100 of this embodiment is a portable electronic device. For example, the portable electronic device may be a mobile phone, a personal digital assistant (PDA), a digital camera, or a handy device having multiple functions such as PDA functions and telecommunication functions. This is for illustrative purposes only, and is not meant to be a limitation of the present invention. According to another variation of this embodiment, the apparatus 100 may be a personal computer (PC) such as a laptop computer or a desktop computer.

As shown in FIG. 1, the apparatus 100 comprises a processing circuit 110, a storage module 120, an image capturing device 130, an image display device 140, an audio input module 150, and an audio output module 160. According to this embodiment, the processing circuit 110, and more particularly, the processing circuit 110 executing program code 110P, is arranged to control operations of the apparatus 100. For example, in a situation where the program code 110P is Read Only Memory (ROM) code, the processing circuit 110 may be a hardware controller with the ROM code embedded therein. This is for illustrative purposes only, and is not meant to be a limitation of the present invention. According to a variation of this embodiment, the program code 110P may be firmware code, while the processing circuit 110 may be a micro control unit (MCU) executing the firmware code. According to another variation of this embodiment, the program code 110P may be software code, while the processing circuit 110 may be a micro processing unit (MPU) executing the software code. According to some special cases of this embodiment or the variations mentioned above, at least a portion of the software code, the firmware code, and the ROM code can be utilized for implementing the associated functions of the multimedia-based data transmission.

In addition, the storage module 120 is arranged to store information. For example, the storage module 120 may comprise a volatile memory such as a random access memory (RAM). In another example, the storage module 120 may comprise a non-volatile memory such as a Flash memory. This is for illustrative purposes only, and is not meant to be a limitation of the present invention. According to a variation of this embodiment, the storage module 120 may comprise an interface circuit arranged to access a portable memory device such as a memory card, where the memory card comprises a Flash memory.

According to this embodiment, the image capturing device 130, the image display device 140, the audio input module 150, and the audio output module 160 are all peripheral devices of the apparatus 100. The image capturing device 130 is a peripheral device for a user to capture images arbitrarily, for example, the image capturing device 130 can be a video camera, or a camcorder. In addition, the image display device 140 is a peripheral device for displaying visual information, and therefore, the user can see the visual information displayed on the image display device 140. For example, the image display device 140 can be a Liquid Crystal Display (LCD) panel or a touch screen panel. Additionally, the audio input module 150 is a peripheral device for the user to record or speak to others through the apparatus 100, and the audio output module 160 is a peripheral device for the user to play back or listen to audio (e.g. music, radio, news, beep, etc.). For example, the audio input module 150 is a microphone, while the audio output module 160 is a speaker. This is for illustrative purposes only, and is not meant to be a limitation of the present invention. According to variations of this embodiment, the audio input module 150 may comprise a microphone, a microphone jack, an audio interfacing circuit, and/or an audio processing circuit, while the audio output module 160 may comprise a speaker, an earphone jack, an audio interfacing circuit, and/or an audio processing circuit.

In this embodiment, the apparatus 100 is capable of performing multimedia-based data transmission through at least one peripheral device thereof, such as one or more of the image capturing device 130, the image display device 140, the audio input module 150, and the audio output module 160. More particularly, the apparatus 100 can be utilized as a target apparatus 100T or a source apparatus 100S during the multimedia-based data transmission mentioned above, where the target apparatus 100T represents the data receiving side during the multimedia-based data transmission, while the source apparatus 100S represents the data transmitting side during the multimedia-based data transmission. For example, in a situation where the apparatus 100 is utilized as the target apparatus 100T, the image capturing device 110 is arranged to capture at least one multi-dimensional barcode image (e.g. a single multi-dimensional barcode image, or a plurality of multi-dimensional barcode images) carrying data to be input into the apparatus 100. In addition, the control circuit 110 is arranged to extract the data carried by the aforementioned at least one multi-dimensional barcode image for further use, where the aforementioned at least one multi-dimensional barcode image is displayed by an electronic device. In another example, in a situation where the apparatus 100 is utilized as the source apparatus 100S, the image display device 140 is arranged to display at least one multi-dimensional barcode image (e.g. a single multi-dimensional barcode image, or a plurality of multi-dimensional barcode images) carrying data to be input into a target apparatus.

Please note that the aforementioned at least one multi-dimensional barcode image may comprise a black/white (B/W) barcode, or comprise a color barcode with colors more than black and white (e.g. colors corresponding to different tones/brightness and different hues). In a situation where a multi-dimensional barcode image is a B/W barcode, it can be referred to as a two-dimensional (2-D) barcode image. In a situation where a multi-dimensional barcode image is a color barcode, it can be referred to as a three-dimensional (3-D) barcode image. Implementation details of the multimedia-based data transmission are further explained according to FIG. 2.

Figure 2:
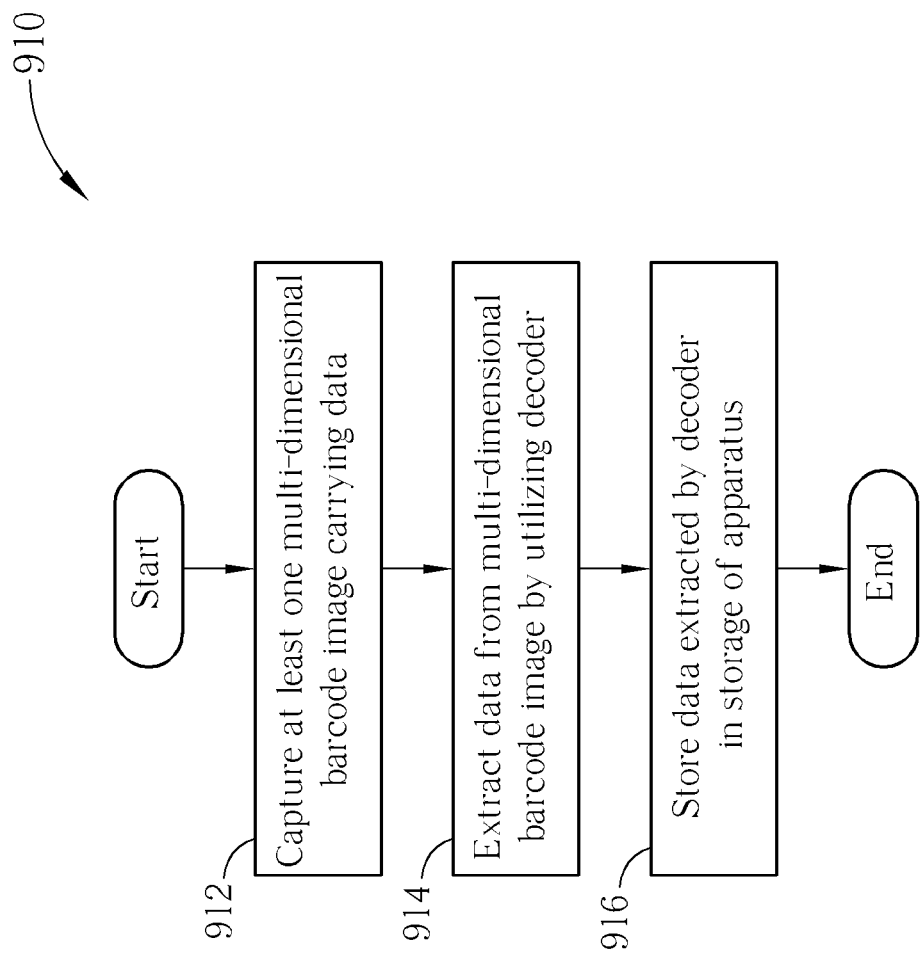
FIG. 2 is a flowchart of a method for performing multimedia-based data transmission according to an embodiment of the present invention.

FIG. 2 is a flowchart of a method 910 for performing multimedia-based data transmission through at least one peripheral device according to an embodiment of the present invention. The method 910 shown in FIG. 2 can be applied to the apparatus 100 shown in FIG. 1, and more particularly, the processing circuit 110 executing the program code 110P. In addition, the method 910 shown in FIG. 2 can be implemented by utilzing the apparatus 100 shown in FIG. 1, and more particularly, the processing circuit 110 executing the program code 110P. The method is described as follows.

In Step 912, an apparatus (such as the apparatus 100) captures at least one multi-dimensional barcode image carrying data, by utilizing an image capturing device.

In Step 914, the apparatus extracts the data from the multi-dimensional barcode image by utilizing a decoder (e.g. a portion or all of the processing circuit 110).

In Step 916, the apparatus stores the data extracted by the decoder in a storage of the apparatus, such as the storage module 120. In particular, the processing circuit 110 is arranged to store the data extracted from the multi-dimensional barcode images into the storage module 120. For example, the processing circuit 110 may import the data into a database within the storage module 120. In another example, the processing circuit 110 may save the data as a file in the storage module 120.

In particular, the aforementioned at least one multi-dimensional barcode image may represent a single multi-dimensional barcode image or a plurality of multi-dimensional barcode images, and can be referred to as the multi-dimensional barcode image(s) hereafter, for simplicity.

According to a variation of this embodiment, in the situation where the apparatus 100 is the target apparatus 100T, the audio input module 150 is arranged to receive audio information from the source apparatus (such as the source apparatus 100S) that displays the multi-dimensional barcode image(s) toward the apparatus 100. In particular, the audio information of this variation may carry a portion of the data to be input into the target apparatus 100T.

Figure 3:
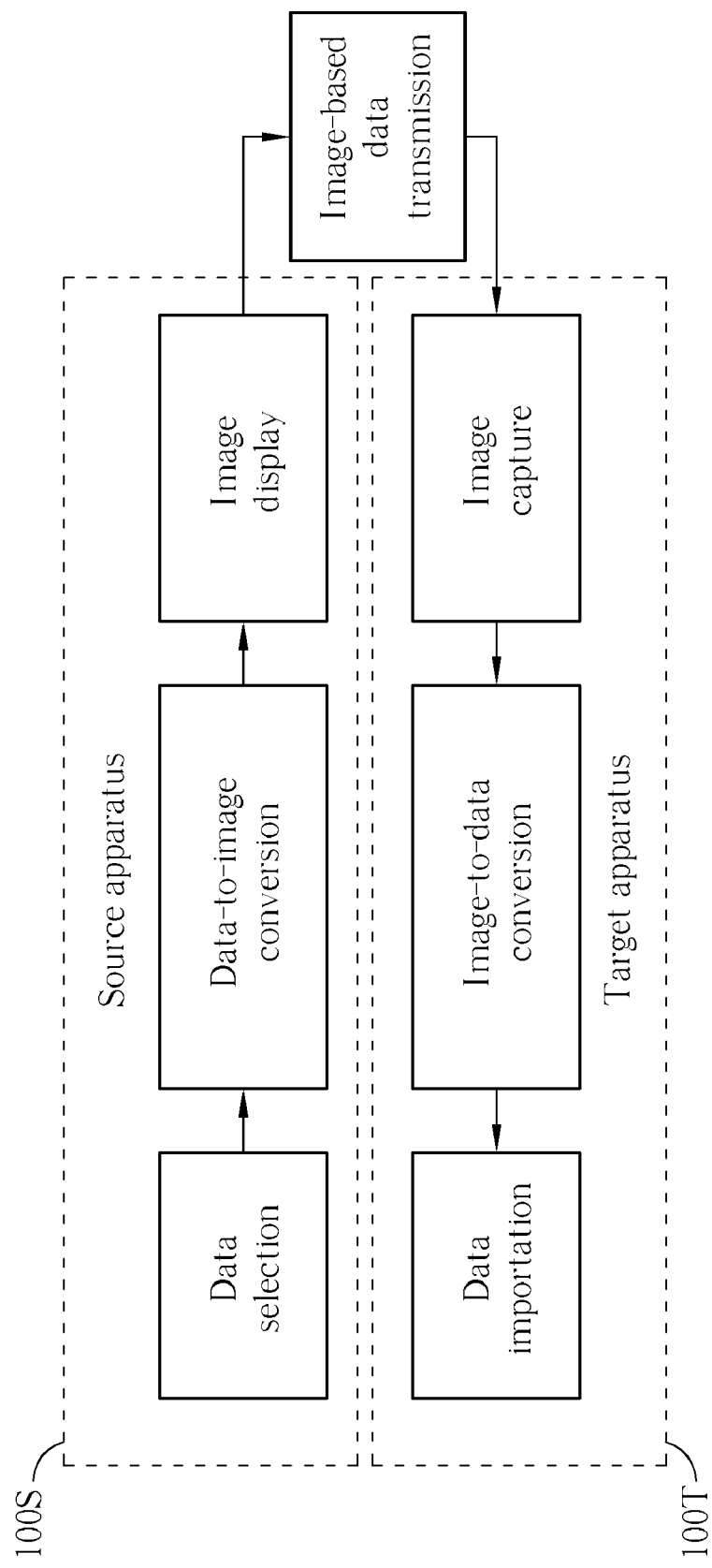
FIG. 3 is a block diagram illustrating an exemplary data flow regarding the method shown in FIG. 2 according to a special case of the embodiment shown in FIG. 2.

FIG. 3 is a block diagram illustrating an exemplary data flow regarding the method 910 shown in FIG. 2. A source apparatus 100S is sending data to a target apparatus 100T through image-based data transmission. In some embodiments, both the source and target apparatus 100S and 100T are capable of encoding, displaying image, decoding, and image capturing for image-base data transmission, so the two apparatus can exchange their roles.

In practice, the apparatus 100 can be equipped with JavaScript (which is sometimes known as Java Script, Javascript, etc.) and the required environment thereof, in order to implement the multimedia-based data transmission of the method 910 shown in FIG. 2 and the exemplary data flow shown in FIG. 3. For example, at least a portion of the program code 110P can be implemented with the JavaScript. In another example, the program code 110P may originally include none of the associated functions of the multimedia-based data transmission, and the user may install an installation package that is downloaded from a website of a service provider through the Internet or an installation package stored in a CD-ROM provided by the service provider, causing the program code 110P to include the associated functions of the multimedia-based data transmission.

As shown in the source apparatus 100S in FIG. 3, the functional block labeled "Data selection" represents a reading process, in which the processing circuit 110 of the source apparatus 100S reads from memory (e.g. the storage module 120 of the source apparatus 100S) the data for being transmitted. In addition, the functional block labeled "Data-to-image conversion" represents a data-to-image conversion process, in which the processing circuit 110 of the source apparatus 100S performs data-to-image conversion on the data to generate the multi-dimensional barcode image(s) carrying the data. In particular, the processing circuit 110 of the source apparatus 100S converts the data to one or more multi-dimensional barcode images and the image display device 140 thereof displays the one or more multi-dimensional barcode images. In some embodiment, the multi-dimensional barcode image(s) can be generated by encoding the data into image or video pictures. Additionally, the functional block labeled "Image display" represents an image display process, in which the image display device 140 of the source apparatus 100S displays the multi-dimensional barcode image(s) under the control of the processing circuit 110 of the source apparatus 100S.

On the path between the source apparatus 100S and the target apparatus 100T shown in FIG. 3, "Image-based data transmission" represents an imaging/quasi-imaging process. In a situation where the aforementioned at least one multi-dimensional barcode image represents a single multi-dimensional barcode image, the single multi-dimensional barcode image is projected onto an image sensor within the image capturing device 130 of the target apparatus 100T in the imaging/quasi-imaging process. In a situation where the aforementioned at least one multi-dimensional barcode image represents a plurality of multi-dimensional barcode images, the multi-dimensional barcode images are projected onto the image sensor within the image capturing device 130 of the target apparatus 100T one by one in the imaging/quasi-imaging process.

As shown in FIG. 3, the functional block labeled "Image capture" represents an image capturing process, in which the image capturing device 130 of the target apparatus 100T captures the multi-dimensional barcode image(s) under the control of the processing circuit 110 of the target apparatus 100T. In addition, the functional block labeled "Image-to-data conversion" represents an image-to-data conversion process, in which the processing circuit 110 of the target apparatus 100T performs image-to-data conversion on the captured multi-dimensional barcode image(s) to extract the data carried by the multi-dimensional barcode image(s), where the data obtained in the image-to-data conversion process is a reproduced version of the data obtained/read in the read process mentioned above. In some embodiments, the data is extracted by decoding the image or video pictures into data. Additionally, the functional block labeled "Data importation" represents a write process, in which the processing circuit 110 of the target apparatus 100T writes the data into the storage module 120 of the target apparatus 100T, and more particularly, imports the data into a database within the storage module 120 of the target apparatus 100T, such as the database mentioned above.

Although the processes represented by the functional blocks shown in FIG. 3 are explained one by one, this by no means implies that any of the processes should not start until the previous process thereof is completed. Please note that all or a portion of the processes represented by the functional blocks shown in FIG. 3 can operate at the same time for this exemplary data flow shown in FIG. 3.

Figure 4:
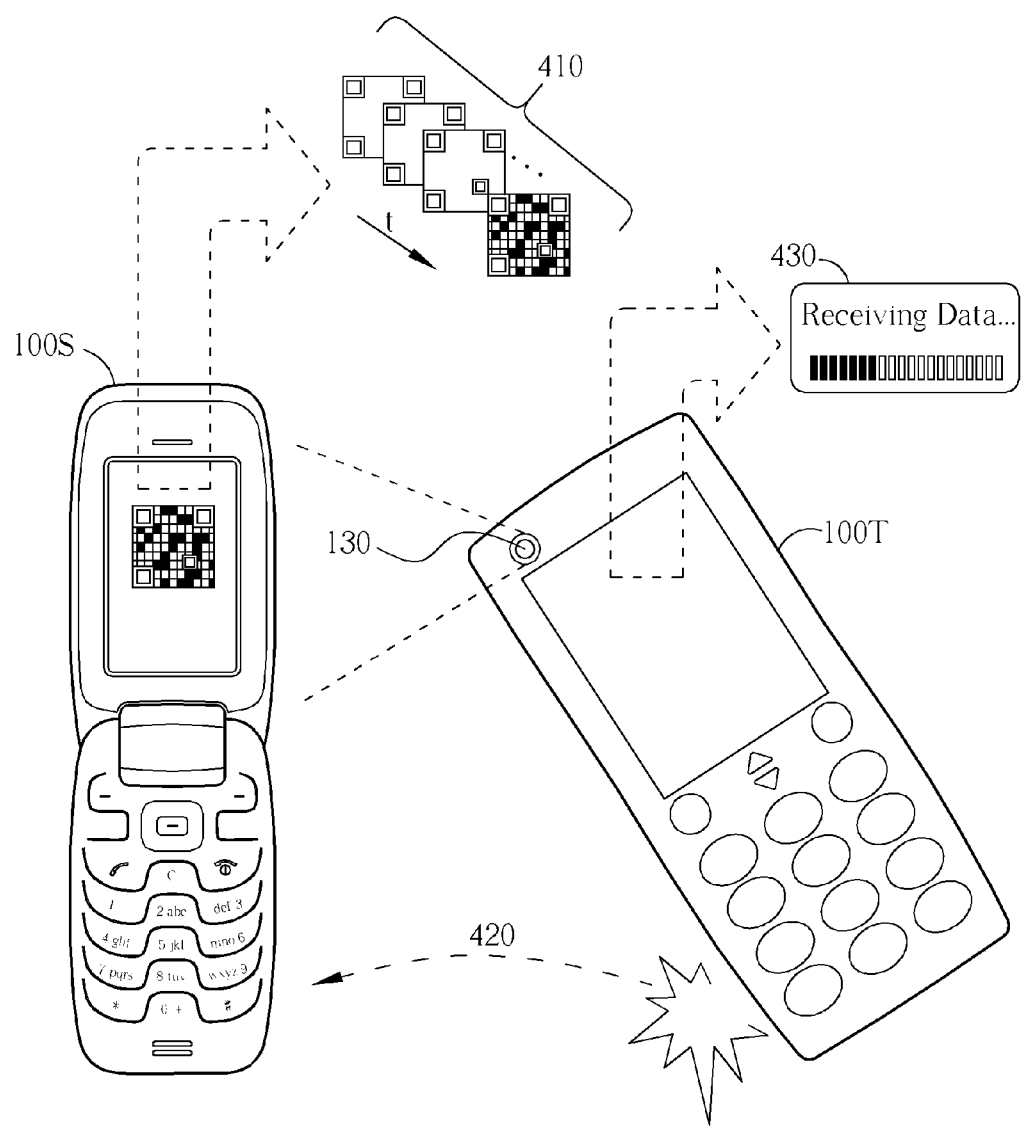
FIG. 4 illustrates a multimedia-based data transmission scheme of the method shown in FIG. 2 according to a first embodiment of the present invention.

FIG. 4 illustrates a multimedia-based data transmission scheme of the method 910 shown in FIG. 2 according to a first embodiment of the present invention. Referring to the multimedia-based data transmission scheme shown in FIG. 4, some implementation details of the source apparatus 100S and the target apparatus 100T shown in FIG. 3 are further explained as follows.

According to this embodiment, the image display device 140 of the source apparatus 100S displays the aforementioned at least one multi-dimensional barcode image, and more particularly, a plurality of multi-dimensional barcode images 410 shown in FIG. 4, where a time axis (labeled "t") is illustrated with the multi-dimensional barcode images 410 for indicating that one by one the multi-dimensional barcode images 410 are displayed by the image display device 140 of the source apparatus 100S. For example, the multi-dimensional barcode images 410 may comprise the B/W barcode mentioned above, where the multi-dimensional barcode images 410 can be referred to as 2-D barcode images. In another example, the multi-dimensional barcode images 410 may comprise the color barcode mentioned above, where the multi-dimensional barcode images 410 can be referred to as 3-D barcode images.

In this embodiment, the image capturing device 130 of the target apparatus 100T captures the multi-dimensional barcode images, and the image display device 140 of the target apparatus 100T displays information indicating that the target apparatus 100T is receiving data from the source apparatus 100S, for example, displays a window with a scale indicating the completion rate of the multimedia-based data transmission.

Regarding the target apparatus 100T, under the control of the processing circuit 110 thereof, the audio output module 160 thereof is arranged to output a feedback such as an audio feedback 420 to the source apparatus 100S that displays the multi-dimensional barcode images 410 toward the target apparatus 100T, where the audio output module 160 can be regarded as a feedback output module, and under control of the processing circuit 100 of the target apparatus 100T, the feedback output module 160 thereof is arranged to output the feedback in response to the captured multi-dimensional barcode images. For example, the audio feedback 420 may comprise information that indicates completion of receiving a specific multi-dimensional barcode image of the multi-dimensional barcode images 410, in order to trigger the source apparatus 100S to switch from the specific multi-dimensional barcode image to the next multi-dimensional barcode image of the multi-dimensional barcode images 410 during the multimedia-based data transmission. In practice, at least a portion of the multi-dimensional barcode images 410 may comprise information that indicates the transmission progress, such as a total number of multi-dimensional barcode images 410, an indication of whether the multimedia-based data transmission should be terminated, or a number of remaining multi-dimensional barcode images. In addition, the audio feedback 420 may further comprise information that triggers the source apparatus 100S to change a resolution of at least a portion of the multi-dimensional barcode images 410 during the multimedia-based data transmission and/or to change one or more control parameters regarding the robustness of the multimedia-based data transmission, such as frame numbers utilized for synchronization between the source apparatus 100S and the target apparatus 100T. For example, when there are too many errors in converting the received multi-dimensional barcode image to data, the target apparatus 100T may send an audio feedback 420 indicating of decreasing the resolution to match the capability of the target apparatus 100T. In another example, when there are too many errors in converting the received multi-dimensional barcode image to data, the target apparatus 100T may send an audio feedback 420 indicating of changing the control parameter regarding the robustness of the multimedia-based data transmission, in order to improve the robustness of the multimedia-based data transmission. As a result, it will be easier for the target apparatus 100T to correctly capture and/or to correctly decode the multi-dimensional barcode images, such as those of this embodiment or some other embodiments.

In some other embodiments, the feedback generated by the target apparatus 100T is not limited to audio, the feedback generated for the source apparatus 100S may be in the form of ultrasound, lights, radio frequency (RF) signals, or a combination thereof. In other words, the audio input module 150 and audio output module 160 in FIG. 1 can be an embodiment of a feedback input/output (I/O) module coupled to the processing circuit 110 for sending a feedback if the apparatus 100 is a target apparatus or receiving a feedback if the apparatus 100 is a source apparatus. The feedback I/O module inputs or outputs a feedback in a form selected from ultrasound, lights, RF signals, audio, or a combination thereof.

Figure 5:
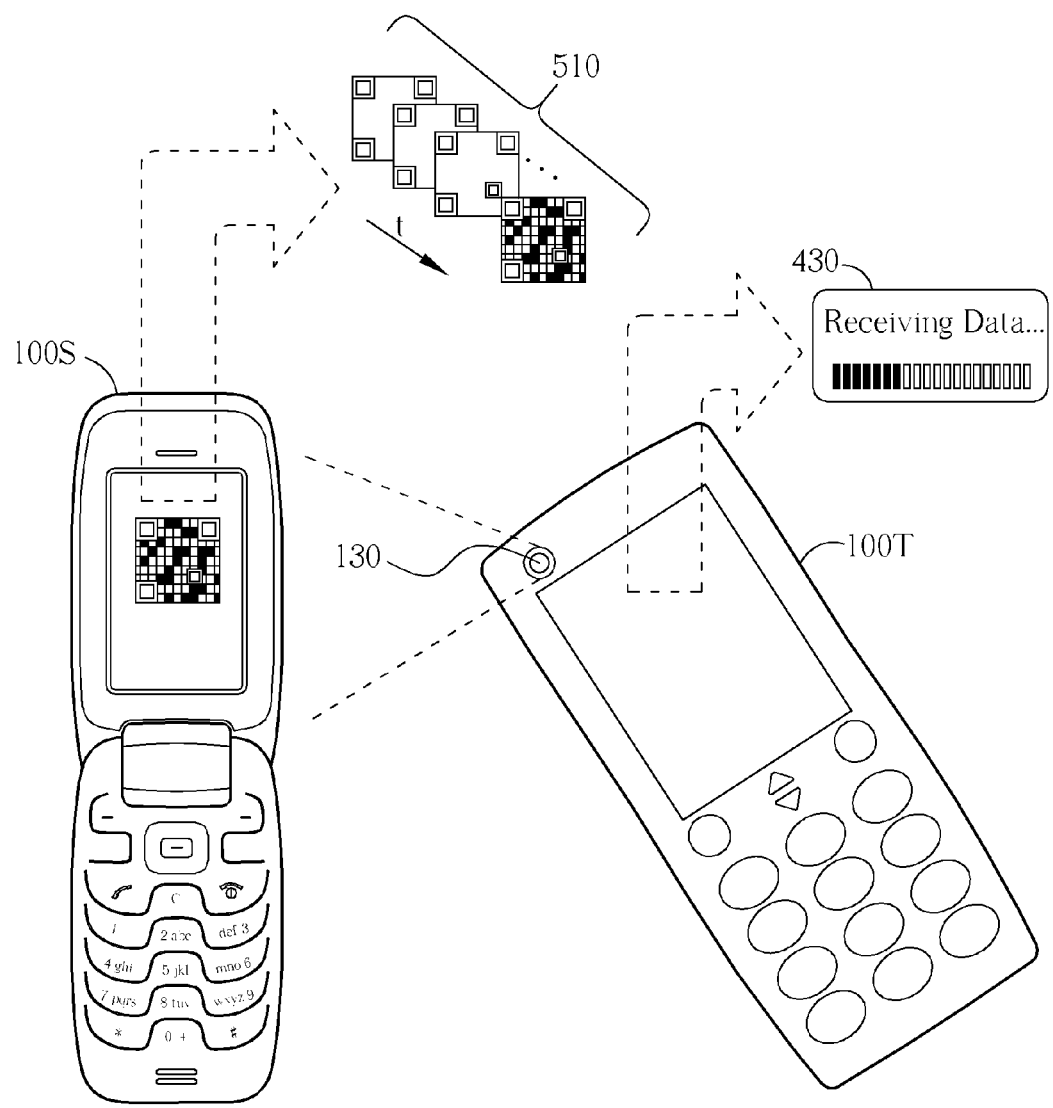
FIG. 5 illustrates another multimedia-based data transmission scheme of the method shown in FIG. 2 according to a second embodiment of the present invention.

FIG. 5 illustrates another multimedia-based data transmission scheme of the method 910 shown in FIG. 2 according to a second embodiment of the present invention. Referring to the multimedia-based data transmission scheme shown in FIG. 5, some implementation details of the source apparatus 100S and the target apparatus 100T shown in FIG. 3 are further explained as follows.

According to this embodiment, the multi-dimensional barcode images 410 mentioned above are replaced by the multi-dimensional barcode images 510 shown in FIG. 5, where at least a portion of the multi-dimensional barcode images 510 are generated by inter-frame encoding. In some embodiments, resolutions of the multi-dimensional barcode images 510 are variable (which means they may be not all the same), with one of the multi-dimensional barcode images 510 that has a low resolution (e.g. a resolution that is lower than the resolution of at least a portion of the others of the multi-dimensional barcode images 510) carrying at least one parameter for controlling the multimedia-based data transmission. For example, the first displayed multi-dimensional barcode image of the multi-dimensional barcode images 510 may have a low resolution to ensure that one or more parameters for controlling the multimedia-based data transmission can be correctly transmitted to the target apparatus 100T.

More particularly, in this embodiment, all of the multi-dimensional barcode images 510 are generated by inter-frame encoding. In practice, Reed-Solomon codes can be utilized for generating the barcode of the multi-dimensional barcode images 510. Taking (n, k) code as an example with k<n, in a situation where n frames (or n multi-dimensional barcode images) of the multi-dimensional barcode images 510 are transmitted during the multimedia-based data transmission, the data corresponding to the n frames can be correctly extracted with ease by decoding at least k frames (or k multi-dimensional barcode images) of the n frames. Therefore, when some of the n frames are not properly captured by the image capturing device 130 of the target apparatus 100T (e.g. some captured images are not clear, or some captured images do not include the whole barcode area), the processing circuit 110 of the target apparatus 100T can typically extract the data corresponding to the n frames, as long as the values of k and n are properly selected by the user or designed by the designer.

Please note that the target apparatus 100T of this embodiment has no need to generate any feedback (such as the audio feedback 420 shown in FIG. 4), since the inter-frame encoding can ensure the correctness of the multimedia-based data transmission. This is for illustrative purposes only, and is not meant to be a limitation of the present invention. According to a variation of this embodiment, the target apparatus 100T may still generate a feedback such as the audio feedback 420 shown in FIG. 4 for the source apparatus 100S.

Figure 6:
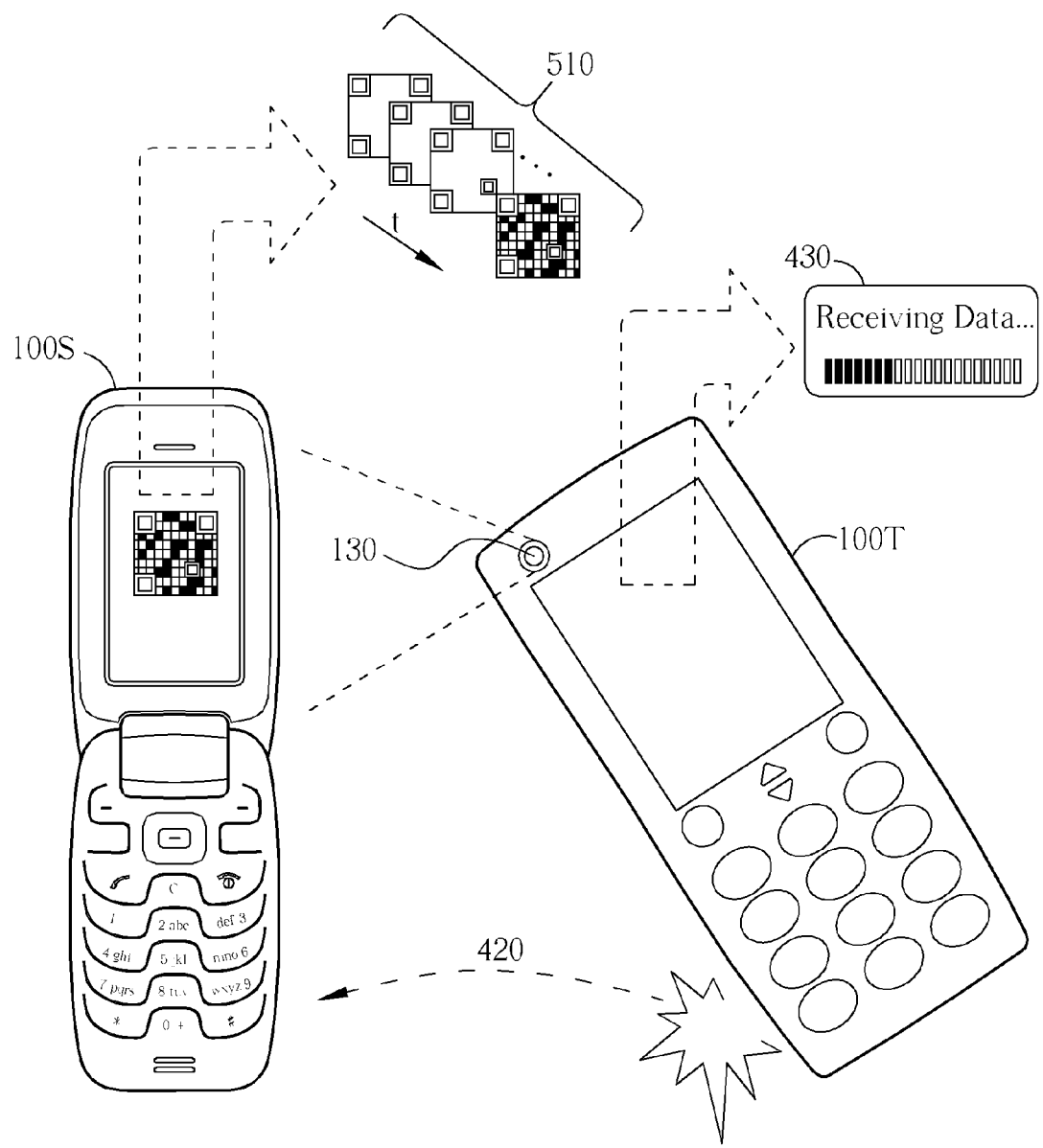
FIG. 6 illustrates another multimedia-based data transmission scheme of the method shown in FIG. 2 according to a third embodiment of the present invention.

FIG. 6 illustrates another multimedia-based data transmission scheme of the method 910 shown in FIG. 2 according to a third embodiment of the present invention, where this embodiment is a variation of the embodiments respectively shown in FIG. 4 and FIG. 5. As mentioned above, at least a portion of the multi-dimensional barcode images 510 are generated by inter-frame encoding. In addition, the target apparatus 100T outputs the audio feedback 420 mentioned above to the source apparatus 100S that displays the multi-dimensional barcode images 510 toward the target apparatus 100T. Similar descriptions for this embodiment are not repeated in detail here.

It is an advantage of the present invention that the present invention can provide the users with handy apparatus capable of performing data transmission efficiently and rapidly with ease whenever it is needed to exchange data, such as files, photos, memorandums (memos), electronic business cards, Global Navigation Satellite Systems (GNSS) or Global Positioning System (GPS) information of a specific location, etc. As a result, the users have no need to deal with any connection cable or complicated settings of hardware resources such as Bluetooth (BT) or Wireless Local Area Network (Wireless LAN, WLAN) communication modules.

It is another advantage of the present invention that the users may save their time and communication costs since the multimedia-based data transmission of the present invention can be performed at once without the aids from the telecommunication network of any service provider.

It is another advantage of the present invention that, as the multimedia-based data transmission mentioned above can be performed between a portable electronic device and a PC that are implemented according to the present invention, data transmission or synchronization can be practiced efficiently and rapidly with ease, having no need to prepare any high cost accessory such as an additional BT communication module for the PC.

Those skilled in the art will readily observe that numerous modifications and alterations of the device and method may be made while retaining the teachings of the invention.

What is claimed is:

1. An apparatus for performing multimedia-based data transmission, the apparatus comprising:
    an image capturing device, the image capturing device being a peripheral device for capturing images, wherein the image capturing device is arranged to capture a plurality of multi-dimensional barcode images carrying data; and
    a processing circuit arranged to control operations of the apparatus and to extract the data carried by the multi-dimensional barcode images;
    wherein resolutions of the multi-dimensional barcode images are variable, with one of the multi-dimensional barcode images that has a low resolution carrying at least one parameter for controlling the multimedia-based data transmission.

2. The apparatus of claim 1, further comprising:
    a storage module arranged to store information;
    wherein the processing circuit is further arranged to store the data extracted from the multi-dimensional barcode images into the storage module.

3. The apparatus of claim 1, further comprising:
    a feedback output module, wherein the feedback output module is a peripheral device for outputting a feedback;
    wherein under control of the processing circuit, the feedback output module is arranged to output the feedback in response to the captured multi-dimensional barcode images.

4. The apparatus of claim 3, wherein the feedback comprises information that indicates completion of receiving a specific multi-dimensional barcode image of the multi-dimensional barcode images, in order to trigger a source apparatus to switch from the specific multi-dimensional barcode image to a next multi-dimensional barcode image of the multi-dimensional barcode images during the multimedia-based data transmission.

5. The apparatus of claim 3, wherein the feedback comprises information that triggers a source apparatus to change a resolution of at least a portion of the multi-dimensional barcode images during the multimedia-based data transmission and/or to change one or more control parameters regarding robustness of the multimedia-based data transmission.

6. The apparatus of claim 1, wherein at least a portion of the multi-dimensional barcode images are generated by inter-frame encoding.

7. The apparatus of claim 1, further comprising:
    an image display device, the image display device being a peripheral device for displaying visual information, wherein in a situation where the apparatus is utilized as a source apparatus, the processing circuit converts data to one or more multi-dimensional barcode images and the image display device displays the one or more multi-dimensional barcode images.

8. A method for performing multimedia-based data transmission, the method comprising:
    providing an apparatus with an image capturing device, wherein the image capturing device is a peripheral device for capturing images;
    utilizing the image capturing device to capture a plurality of multi-dimensional barcode images carrying data; and
    extracting the data carried by the multi-dimensional barcode images;
    wherein resolutions of the multi-dimensional barcode images are variable, with one of the multi-dimensional barcode images that has a low resolution carrying at least one parameter for controlling the multimedia-based data transmission.

9. The method of claim 8, further comprising:
    storing the data extracted from the multi-dimensional barcode images into a storage module.

10. The method of claim 8, further comprising:
    providing the apparatus with a feedback output module, wherein the feedback output module is a peripheral device for outputting a feedback; and
    utilizing the feedback output module to output the feedback in response to the captured multi-dimensional barcode images.

11. The method of claim 10, wherein the feedback comprises information that indicates completion of receiving a specific multi-dimensional barcode image of the multi-dimensional barcode images, in order to trigger a source apparatus to switch from the specific multi-dimensional barcode image to a next multi-dimensional barcode image of the multi-dimensional barcode images during the multimedia-based data transmission.

12. The method of claim 10, wherein the feedback comprises information that triggers a source apparatus to change a resolution of at least a portion of the multi-dimensional barcode images during the multimedia-based data transmission and/or to change one or more control parameters regarding robustness of the multimedia-based data transmission.

13. The method of claim 8, wherein at least a portion of the multi-dimensional barcode images are generated by inter-frame encoding.

14. The method of claim 8, further comprising:
    providing the apparatus with an image display device, wherein the image display device is a peripheral device for displaying visual information; and
    in a situation where the apparatus is utilized as a source apparatus, converting data to one or more multi-dimensional barcode images and utilizing the image display device to display the one or more multi-dimensional barcode images.

15. An apparatus for performing multimedia-based data transmission, the apparatus comprising:
    a processing circuit arranged to control operations of the apparatus, wherein the processing circuit is arranged to convert data to multi-dimensional barcode images; and
    an image display device, the image display device being a peripheral device for displaying visual information, wherein the image display device is arranged to display one or more multi-dimensional barcode images carrying data;
    wherein resolutions of the multi-dimensional barcode images are variable, with one of the multi-dimensional barcode images that has a low resolution carrying at least one parameter for controlling the multimedia-based data transmission.

16. The apparatus of claim 15, further comprising:
    a feedback input module, receiving a feedback from a target apparatus capturing the one or more multi-dimensional barcode images.

17. The apparatus of claim 16, wherein the feedback comprises information that indicates completion of receiving a specific multi-dimensional barcode image of the one or more multi-dimensional barcode images.

18. The apparatus of claim 16, wherein the feedback comprises information that triggers the apparatus to change a resolution of at least a portion of the one or more multi-dimensional barcode images during the multimedia-based data transmission and/or to change one or more control parameters regarding robustness of the multimedia-based data transmission.

19. The apparatus of claim 15, wherein at least a portion of the one or more multi-dimensional barcode images are generated by inter-frame encoding.

20. An apparatus for performing multimedia-based data transmission, the apparatus comprising:

an image capturing device, the image capturing device being a peripheral device for capturing images, wherein the image capturing device is arranged to capture a plurality of multi-dimensional barcode images carrying data;

a processing circuit arranged to control operations of the apparatus and to extract the data carried by the multi-dimensional barcode images; and a feedback output module, wherein the feedback output module is a peripheral device for outputting a feedback;

wherein under control of the processing circuit, the feedback output module is arranged to output the feedback in response to the captured multi-dimensional barcode images, and the feedback is utilized for triggering at least one other apparatus.

21. A method for performing multimedia-based data transmission, the method comprising:

providing an apparatus with an image capturing device, wherein the image capturing device is a peripheral device for capturing images;

providing the apparatus with a feedback output module, wherein the feedback output module is a peripheral device for outputting a feedback;

utilizing the image capturing device to capture a plurality of multi-dimensional barcode images carrying data;

extracting the data carried by the multi-dimensional barcode images; and utilizing the feedback output module to output the feedback in response to the captured multi-dimensional barcode images, wherein the feedback is utilized for triggering at least one other apparatus.

22. An apparatus for performing multimedia-based data transmission, the apparatus comprising:

a processing circuit arranged to control operations of the apparatus, wherein the processing circuit is arranged to convert data to multi-dimensional barcode images;

an image display device, the image display device being a peripheral device for displaying visual information, wherein the image display device is arranged to display one or more multi-dimensional barcode images carrying data; and a feedback input module arranged to receive a feedback from a target apparatus capturing the one or more multi-dimensional barcode images;

wherein the feedback is utilized for triggering the apparatus.

\* \* \* \* \*